United States Patent
Nachbauer et al.

(10) Patent No.: US 7,329,135 B2
(45) Date of Patent: Feb. 12, 2008

(54) DEVICE FOR TRANSMITTING SIGNALS OR CURRENT BETWEEN END POINTS

(75) Inventors: Otto Nachbauer, Floβ (DE); Frank Schroer, Weiden (DE)

(73) Assignee: Nexans (FR)

( * ) Notice: Subject to any disclaimer, the term of this patent is extended or adjusted under 35 U.S.C. 154(b) by 0 days.

(21) Appl. No.: 11/509,087

(22) Filed: Aug. 23, 2006

(65) Prior Publication Data

US 2007/0049083 A1 Mar. 1, 2007

(30) Foreign Application Priority Data

Aug. 26, 2005 (FR) .................................. 05 52573
Nov. 25, 2005 (EP) .................................. 05292521

(51) Int. Cl.
*H01R 3/00* (2006.01)

(52) U.S. Cl. ..................................... 439/164
(58) Field of Classification Search ............... 439/164, 439/15

See application file for complete search history.

(56) References Cited

U.S. PATENT DOCUMENTS

| 3,597,721 | A | 8/1971 | Mangan ......................... 339/5 |
| 5,413,492 | A | 5/1995 | Obata .......................... 439/164 |
| 6,572,393 | B2* | 6/2003 | Kawamura ................... 439/164 |
| 7,175,453 | B2* | 2/2007 | Yajima et al. ............... 439/164 |
| 2001/0044229 | A1 | 11/2001 | Bunselmeier et al. ....... 439/164 |
| 2003/0094955 | A1 | 5/2003 | Bonn .......................... 324/539 |
| 2005/0164524 | A1 | 7/2005 | Korber et al. ................. 439/15 |

FOREIGN PATENT DOCUMENTS

EP 0556779 8/1993

OTHER PUBLICATIONS

European Search Report- Apr. 21, 2006.

\* cited by examiner

*Primary Examiner*—Tho D. Ta
(74) *Attorney, Agent, or Firm*—Sofer & Haroun, LLP

(57) ABSTRACT

A device for transmitting signals or current between end points which can be moved relative to one another is specified between which at least two flat ribbon lines (4-7) extending in turns and accommodated in an essentially circular cassette are arranged which have at least one electrical conductor, t the end points, continuing lines can be connected to the flat ribbon lines (4-7)—The cassette consists of a rotor (1) which is rotatable about its axis, and a stationary stator (2), which enclose between them an annular winding space (3) for accommodating the flat ribbon lines (4-7) One of the flat ribbon lines being arranged between one end point each of the rotor (1) each and one end point of the stator (2), in such a manner that it rests against he rotor (1) with at least one first turn and, after passing through a U-shaped reversing point, against the stator (2) with at least one second turn, the direction of winding of which is opposite to that of the first turn. All flat ribbon lines (4-7) used in the device are combined together with a common annular conductor support to form a one-piece unit constructed in the form of a printed circuit, which is arranged in the winding space (3) of the cassette in the assembled position, and the conductors of the individual flat ribbon lines (4-7) are continued without interruption in the conductor support.

5 Claims, 2 Drawing Sheets

DEVICE FOR TRANSMITTING SIGNALS OR CURRENT BETWEEN END POINTS

RELATED APPLICATION

This application claims the benefit of priority from the European Application No.: 05292521.1 filed on Nov. 25, 2005, the entirety of which is incorporated herein by reference.

DESCRIPTION

The invention relates to a device for transmitting signals or current between end points which can be moved relative to one another and between which at least two flat ribbon lines extending in turns and accommodated in an essentially circular cassette are arranged which have at least one electrical conductor, to which lines continuing at the end points can be connected and the length of which is greater than the distance between the end points, in which the cassette consists of a rotor, which is rotatable about its axis and carries at least two end points offset with respect to one another in the circumferential direction, and a stationary stator also carrying at least two end points which are offset with respect to one another in the circumferential direction, which enclose between them an annular winding space for accommodating the flat ribbon lines, one of the flat ribbon lines being arranged between one end point each of the rotor and one end point of the stator, in such a manner that it rests against the rotor with at least one first turn and, after passing through a U-shaped reversing point, against the stator with at least one second turn, the direction of winding of which is opposite to that of the first turn (EP 0 556 779 Bi)

Such a device is needed, for example, for transmitting a signal for triggering the airbag of an impact protection for motor vehicles. It is accommodated in the steering wheel of a motor vehicle for transmitting electrical signals but also electrical current. Using such a device, signals and/or current can be transmitted between stationary and moving parts of the motor vehicle without sliding contacts or slip rings. Instead of the words "flat ribbon line", the abbreviation "FBI" will be used in the text which follows.

From EP 0 417 350 A1, a device for the contactless current transmission, for example by means of an FRL wound to form a winding former in the manner of a spring barrel has become known. In the case of a relative movement of rotation of the two end points connected by the FRL, the wound-up FBI "breathes" like 10 the spring of a clock. The turns of the wound FRL are pulled together to a smaller diameter in one direction of rotation. In the other direction of rotation, they open up again to a larger diameter.

From EP-0 735 631 BI, a device for connecting two end points, which can be rotated relative to one another, is known in which the winding former is divided into two part windings with oppositely directed winding direction and a U-shaped reversing point between which an annular guide body is arranged. The reversing point between the part windings engages the guide body which is carried along in the circumferential direction of the cassette with a movement of rotation of the rotor by the part windings changing their diameter. The guide body is used for guiding and for mutually supporting the part windings. When the device is operated, it slides on a bottom, located between stator and rotor, of a corresponding cassette. Disturbing noises can frequently not be avoided in this device, due to this process alone but also to vibrations during the travel. The guide body also represents an additional component.

The known device according to EP 0 556 779 BI, mentioned initially, operates without separate guide body for the part windings. In this device, these are formed by a number of FRL5, each of which is arranged with a U-shaped reversing point in the cassette of the device. Each FRL is connected at its end to an end point, one of which is attached to the rotor of the cassette and the other one of which is attached to its stator, The end points of the individual FRL5 are offset with respect to one another in the circumferential direction of the cassette, Each PAL, on the one hand, rests against the rotor with a greater length and, on the other hand, against the stator. The FRLs are elastically constructed and the areas of their reversing points are so stable that the lengths of the FRLs lying against rotor and stator are pressed in the direction of both components by them. During a rotation of a steering wheel of a vehicle, equipped with such a cassette, all reversing points thus move in the circumferential direction of the cassette. Since the FRLs must all be assembled individually and contacted at the end points, the known device is complex in its construction and in its production.

The invention is based on the object of arranging the device described initially in such a manner that it can be produced more simply with a simplified structure.

According to the invention, this object is achieved by the fact that all FRLs used in the device are combined, together with a common annular conductor support, to form a one-piece unit constructed in the form of a printed circuit, which is arranged in the winding space of the cassette in the assembled position, and the conductors of the individual FRLs are continued without interruption in the conductor support.

In this device, only a single prefabricated component must be assembled for transmitting signals or current. This component consisting of the conductor support and at least two PALs can be produced as printed circuit in so-called flex print technology. In this arrangement, all conductors of the individual FRLs are continued in the required length in the common conductor support which ensures an electrically conducting connection to the in each case associated end point. When a cassette with this device is built up, only the conductor support now needs to be laid on a bottom of the winding space existing between rotor and stator, for example, and connected on one side to the end points located there. Following this, the individual FRLs are successively bent with U-shaped reversing points, placed both against the stator and against the rotor and connected to the other end points in each case at their ends.

An illustrative embodiment of the subject matter of the 15 invention is shown in the drawings, in which.

Structure and arrangement of a device with a cassette to be assembled in the steering wheel of a vehicle are basically known and described, for example, in the documents mentioned initially. Corresponding details will not therefore be discussed in greater detail here.

Figure 1:
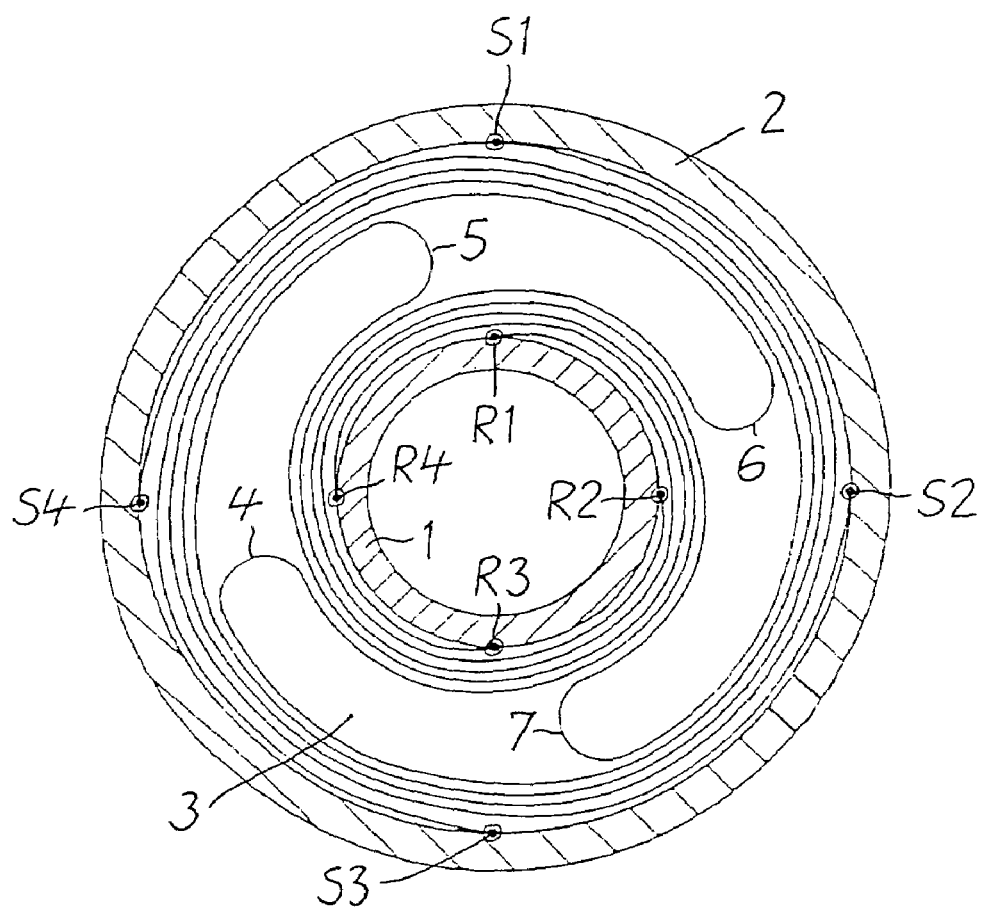
FIG. 1 shows a top view of an open cassette for an airbag with a device according to the invention in a diagrammatic representation.
Figure 2:
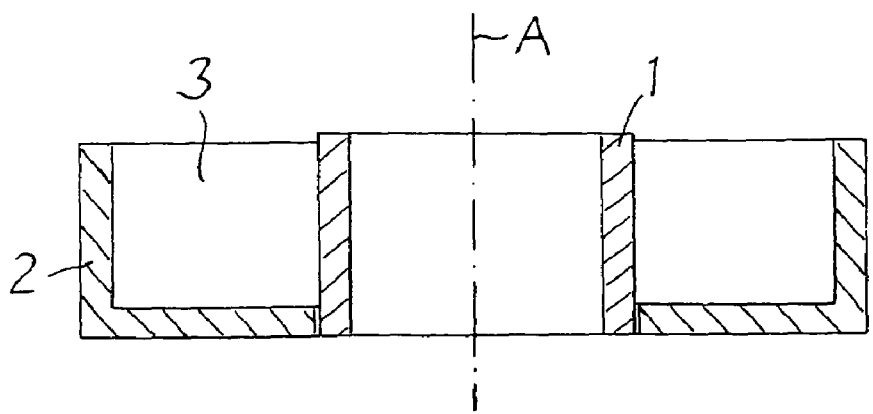
FIG. 2 shows a section through a cassette according to FIG. 1.

In the device according to FIGS. 1 and 2, a cassette is used which has a rotor 1 which is rotatable around an axis A, and a stator 2. Of the two parts, only circular walls are shown diagrammatically in FIG. 1. Between rotor 1 and stator 2, a winding space 3 exists in which four FRLs 4, 5, 6 and 7 are arranged in the illustrative embodiment shown. The rotor 1 carries four end points R1, R2, R3 and R4, which are offset with respect to one another in the circumferential direction, whereas four end points S1 S2, S3 and S4, which are also offset with respect to one another in the circumferential direction are attached to the stator 2. Each of the four FRLs 4, 5, 6 and 7 is connected to one each of the end points of the rotor 1 and of the stator 2 and electrically conductively connected in these in such a manner that continuing lines can be electrically conductively connected. For this purpose, the four end points Ri to R4, on the one hand, and S to S4, on the other hand, are connected to one another by connecting lines and in each case combined at one point of the rotor 1, on the one hand, and of the stator 2, on the other hand.

According to the invention, the four FRLs 4 to 7 are combined to form a one-piece unit together with an annular conductor support 8. The conductors of the FRL5 4 to 7 are conducted without interruption into the conductor support 8 where they extend to the area of the end points to which they are to be connected. The unit of FRL5 4 to 7 and conductor support 8 is constructed as printed circuit in so-called flex print technology. As a result, it can be produced in a very simple and precise manner in known technology.

Figure 3:
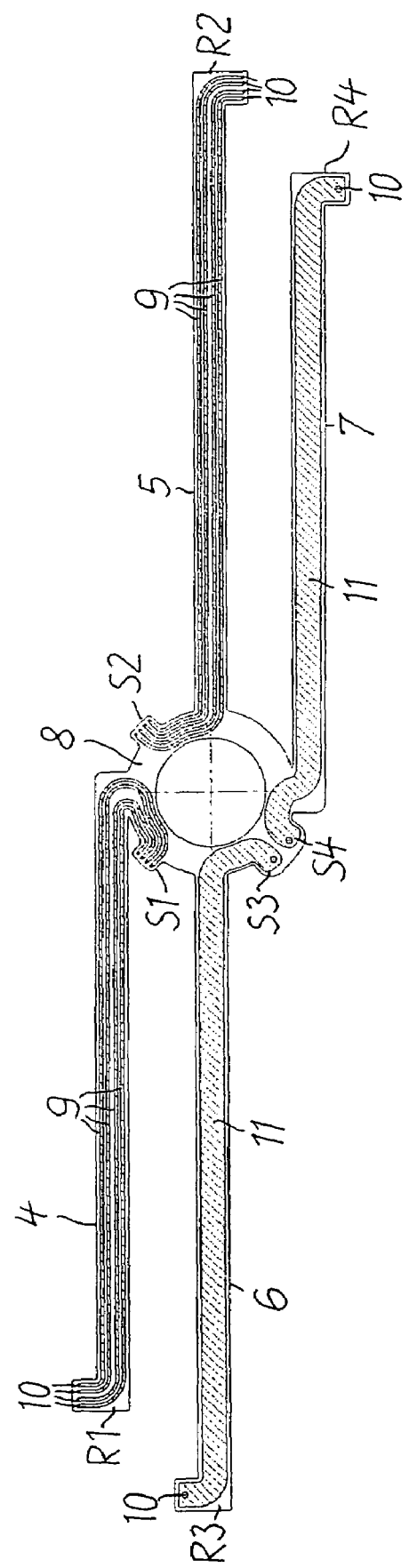
FIG. 3 shows a diagrammatic view of an FRL unit which can be used in the device in enlarged representation.

The conductor support 8 is constructed annularly and dimensioned in such a manner that it can be introduced into the winding space 3 of the cassette by enclosing the rotor 1. Its dimensions are advantageously selected in such a manner that the conductor support 8 fits into the winding space 3 as accurately as possible and, for example, can be laid onto its bottom. For this purpose, it is advantageously constructed to be annular but can also have another annular geometric form. Its width then advantageously very accurately corresponds to the radial distance between the walls of rotor 1 and stator 2. The four FRLs 4 to 7 can all be equally long. However, they can also have different lengths. FIG. 3 diagrammatically shows a unit consisting of a conductor support 8 and four FRLs 4 to 7, which is advantageously produced in flex print technology. In the illuscrative embodiment shown, the FRLs 4 and 5 in each case have four conductors 9 which end in solder lugs 10 at the end of both FRLs. However, contact pins can also be connected there with the conductors 9, which, like the solder lugs 10 can also be produced at the same time during the production off the unit of conductor support 8 and FRLs 4 to 7 in flex print technology.

The conductors 9 are introduced without interruption into the conductor support 8 and continued in it with such a length that they extend to the end points SI to S2 of the stator 2. At these ends of the conductors, too, solder lugs or contact pins can be moulded in flex print technology. The free ends of the FRLs 4 and 5 are located in the end points Ri and R2 of the rotor 1 of the cassette in the assembled position.

The same situation applies to the FRLs 6 and 7 which, in the illustrative embodiment shown, only have one conductor 11 with greater conducting cross section for transmitting higher currents, for example for a steering wheel heater. The FRL5 6 and 7 are located between the end points S3 and S4, on the one hand, and P3 and R4, on the other hand.

In the illustrative embodiment shown, the unit of conductor support 8 and FRL is reproduced with four FRLs 4 to 7. There should be at least two FRLs. However, the unit can also have three or more than four FRLs. The number of conductors in the individual FRLs 35 can be different. There can be two or more conductors.

To produce a device according to the invention, a unit of conductor support 8 and FRL5 4 to 7, produced in flex print technology, for example, from FIG. 3, is introduced into a cassette which can be seen in FIGS. 1 and 2. For this purpose, the conductor support 8 is placed on the bottom of the winding space 3 with FRLs 4 to 7 facing away to the side or co the top, respectively. Following this, the FRL5 4 to 7 are successively bent in such a manner as is shown in FIG. 1 and are connected with their free ends to in each case one of the end points of rotor 1 or stator 2. Following this, the cassette can be completed in conventional technology.

The invention claimed is:

1. Device for transmitting signals or current between end points which can be moved relative to one another comprising:
    at least two flat ribbon lines arranged between said end points extending in turns and accommodated in an essentially circular cassette which have at least one electrical conductor, to which lines continuing at the end points can be connected and the length of which is greater than the distance between the end points;
    said cassette including a rotor, which is rotatable about its axis and carries at least two end points offset with respect to one another in the circumferential direction, and a stationary stator also carrying at least two end points which are offset with respect to one another in the circumferential direction, which enclose between them an annular winding space for accommodating the flat ribbon lines, one of the flat ribbon lines being arranged between one end point each of the rotor and one end point of the stator, in such a manner that it rests against the rotor with at least one first turn and, after passing through a U-shaped reversing point, against the stator with at least one second turn, the direction of winding of which is opposite to that of the first turn;
    wherein said flat ribbon lines used in the device are combined, together with a common annular conductor support, to form a one-piece unit constructed in the form of a printed circuit, which is arranged in the winding space of the cassette in the assembled position, and
    conductors of the individual flat ribbon lines are continued without interruption in the conductor support.

2. Device according to claim 1, wherein the winding space is closed off by a bottom extending at right angles to the rotor and stator, on which the conductor support lies in the assembled position.

3. Device according to claim 1, wherein contact elements such as solder lugs or contact pins are molded on at the free ends of the conductors of the flat ribbon lines.

4. Device according to claim 1, wherein the conductor support is annularly constructed.

5. Device according to claim 4, wherein the dimensions of the conductor support correspond to the radial dimensions of the winding space.

* * * * *